US007963377B2

(12) United States Patent
Quinn et al.

(10) Patent No.: US 7,963,377 B2
(45) Date of Patent: Jun. 21, 2011

(54) DUAL STAGE DAMPERS FOR VEHICLES SUSPENSIONS

(75) Inventors: Shawn G. Quinn, Grand Blanc, MI (US); Gregory J. Fadler, Commerce Township, MI (US); William C. Gregory, Milford, MI (US); Carl T. Wright, Highland, MI (US); Kenneth L. Oblizajek, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 631 days.

(21) Appl. No.: 11/099,980

(22) Filed: Apr. 6, 2005

(65) Prior Publication Data

US 2006/0225979 A1 Oct. 12, 2006

(51) Int. Cl.
*F16F 9/00* (2006.01)
*F16F 9/48* (2006.01)

(52) U.S. Cl. .................. 188/315; 188/316; 188/322.19; 188/322.2

(58) Field of Classification Search .................. 188/286, 188/313, 315, 316, 318, 322.19, 314, 317, 188/322.2
See application file for complete search history.

(56) References Cited

U.S. PATENT DOCUMENTS

| 1,548,773 | A | * | 8/1925 | Ziebarth | 188/287 |
| 1,572,484 | A | * | 2/1926 | Homar | 188/313 |
| 2,332,161 | A | * | 10/1943 | McIntyre et al. | 188/287 |
| 2,452,885 | A | * | 11/1948 | Willard | 188/315 |
| 3,559,776 | A | * | 2/1971 | Schultze | 188/300 |
| 5,246,092 | A | * | 9/1993 | Yamaoka | 188/315 |
| 5,477,949 | A | * | 12/1995 | Forster et al. | 188/322.17 |
| 5,559,700 | A | | 9/1996 | Majeed et al. | 364/424.15 |
| 5,586,627 | A | * | 12/1996 | Nezu et al. | 188/266.6 |
| 5,738,191 | A | | 4/1998 | Forster | |

(Continued)

FOREIGN PATENT DOCUMENTS

DE 1264165 A 3/1968

(Continued)

OTHER PUBLICATIONS

"Micro-Amplitude Damping" fact sheet of Tenneco Automotive Operating Company, Inc., Lake Forest, IL, date unknown, but believed related to disclosure of Patent Application Publication 2006/0081431, published Apr. 20, 2006.

(Continued)

*Primary Examiner* — Melody M Burch

(57) ABSTRACT

Dampers for vehicle suspensions include a housing comprising a tube attached to a wheel axle of a vehicle and a piston rod extending from a piston within the tube and attached to the vehicle body. The piston divides the tube into first and second chambers. In order to damp responses when minor smooth road imperfections impart low force excitations to the wheel of the vehicle, a fluid bypass passageway in the form of a sleeve is positioned around the tube and overlies the piston. This provides second stage quasi-ideal damping at low force excitations to the wheels and thus to the wheel axles of the vehicle. The sleeve communicates with the first and second chambers through metered orifices or valves. As low force excitations from smooth road imperfections displace fluid within the tube through the metered orifices or valves, the orifices damp responses to the low force excitations, thereby smoothing the ride of the vehicle. The fluid bypass passageway facilitates calibrating the damper to respond at least close to an empirically obtained quasi-ideal damper response with respect to the low force excitations.

13 Claims, 9 Drawing Sheets

U.S. PATENT DOCUMENTS

| | | | |
|---|---|---|---|
| 5,944,154 A | 8/1999 | Pees et al. | 188/315 |
| 5,984,060 A | 11/1999 | Clark et al. | 188/322.16 |
| 6,095,486 A * | 8/2000 | Ivers et al. | 251/129.01 |
| 6,321,888 B1 | 11/2001 | Reybrouck et al. | 188/322.2 |
| 6,415,895 B2 * | 7/2002 | Marking et al. | 188/287 |
| 6,926,500 B2 * | 8/2005 | Ferullo | 416/107 |
| 6,966,412 B2 * | 11/2005 | Braswell et al. | 188/286 |
| 2006/0081431 A1 | 4/2006 | Breese | |

FOREIGN PATENT DOCUMENTS

| | | |
|---|---|---|
| DE | 3611288 C2 | 10/1987 |
| DE | 19512866 A1 | 10/1996 |
| DE | 19948328 A1 | 4/2000 |
| DE | 19351353 A1 | 2/2005 |
| DE | 10360140 A1 | 7/2005 |
| GB | 1125104 A | 8/1968 |
| JP | 2000-145870 A | 5/2000 |

OTHER PUBLICATIONS

German Office Action on German application 10 2006 015 716.8-12, which corresponds to U.S. Appl. No. 11/099,980; Action dated Nov. 19, 2009.

* cited by examiner

DUAL STAGE DAMPERS FOR VEHICLES SUSPENSIONS

FIELD OF THE INVENTION

The present invention is directed to dual stage, position and pressure sensitive dampers for suspensions of vehicles. More particularly, the present invention is directed to dual stage dampers for vehicle suspensions which damp small vehicular body and suspension motions arising during operation on relatively smooth road surfaces, as well as the substantial motions normally resisted by damping arrangements in current use.

BACKGROUND OF THE INVENTION

Automotive vehicles include sprung and unsprung masses, wherein, for a vehicle with body and frame, the sprung mass includes the vehicle's frame and body that is fixed to the frame, while the unsprung mass includes the wheels and portions of the vehicle's suspension connecting the sprung mass to axles for the wheels. The sprung mass for vehicles with structurally indistinguishable bodies and frames, referred to as unibody construction, is the total mass of this combined structure; the sprung mass for this type of vehicle is identical to that of the body and frame vehicle. Typically, the sprung mass is connected to wheel axles by shock absorbing devices which include soft springs allowing relative motion between the sprung and unsprung masses and dampers which primarily limit repetitive cyclic motions of the unsprung and sprung masses. Although the damping devices can employ one of many energy-dissipative alternatives and actuations, such as pneumatic or electric, the dominant configuration is hydraulic.

Typically, these fluid filled dampers comprise a hydraulic cylinder with a piston therein that throttles a fluid flow from one side of the piston to the other through apertures in the piston. Currently, there are attempts to increase vehicle ride comfort in at least some vehicles by programmatically regulating damping forces. One such approach involves continually adjustable effective orifice size to preferably regulate the resistance to fluid flow so that damper performance corresponds to desirable performance for the particular operating conditions of the vehicle. These operating conditions change instantaneously depending on vehicle usage, such as on rough roads, smooth roads, during cornering and the like. These programmable devices, employing sensing, control means, and attendant hardware also provide the intended multiple stage performance, but offer a more expensive mechanization to achieve the desired effect. Another suggested approach involves electro-rheological fluid or magnetic-rheological fluid with sensing and control means to adjust flow resistance. Such arrangements are, like the variable orifice size mechanization, complex and relatively expensive.

SUMMARY OF THE INVENTION

In view of the aforedescribed considerations, a damper affixed between the sprung and unsprung masses of a vehicle comprises at least one housing arrangement connected to one of these members and a piston connected to the other member, wherein the piston divides the housing arrangement into first and second chambers. A main fluid passage is provided for transferring fluid between the chambers as the piston moves within the housing due to substantial motion of the vehicle. A bypass fluid passage extends between the first and second chambers, wherein the bypass fluid passage has a first opening on a first side of the piston and a second opening on a second side of the piston when the piston is near neutral position. The first and second openings are spaced by a distance selected to accommodate piston travel occasioned by minimal movement of the unsprung mass to respond to small vibrations imparted to the vehicle by smooth road excitations. Damping achieved through actions of the bypass can be altered by spacing, orifice size, orifice shape, orifice count, or by additional secondary valves which can alter fluid flow. These openings are not limited in position depending on the mechanism that is used to determine fluid flow.

In a further aspect, the housing is configured as at least one tube with a piston mounted to axially reciprocate within the tube in response to motions of the unsprung mass, the passageway being an annular space defined by a sleeve around the tube. The annular space communicates with the first and second chambers in the housing through metered orifices.

In still a further aspect of the invention, the bypass fluid passageway allows the damper to act as a quasi-ideal damper which enables the generation of damper forces as a virtual single-valued function of velocity when operated under motions induced by low force road inputs.

In still another aspect of the damper, the damper is configured as a single tube that dampens low force road impacts in compression when the piston rod is moving into the tube, and dampens low force road impacts in extension when the piston rod is moving out of the tube.

In still another embodiment of the invention, the damper is a gas charged twin tube damper with a bypass sleeve which only restricts flow of the fluid to flow between the first chamber and the second chamber, whereby the damper functions only on extension when the piston rod is moving outwardly from the housing.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
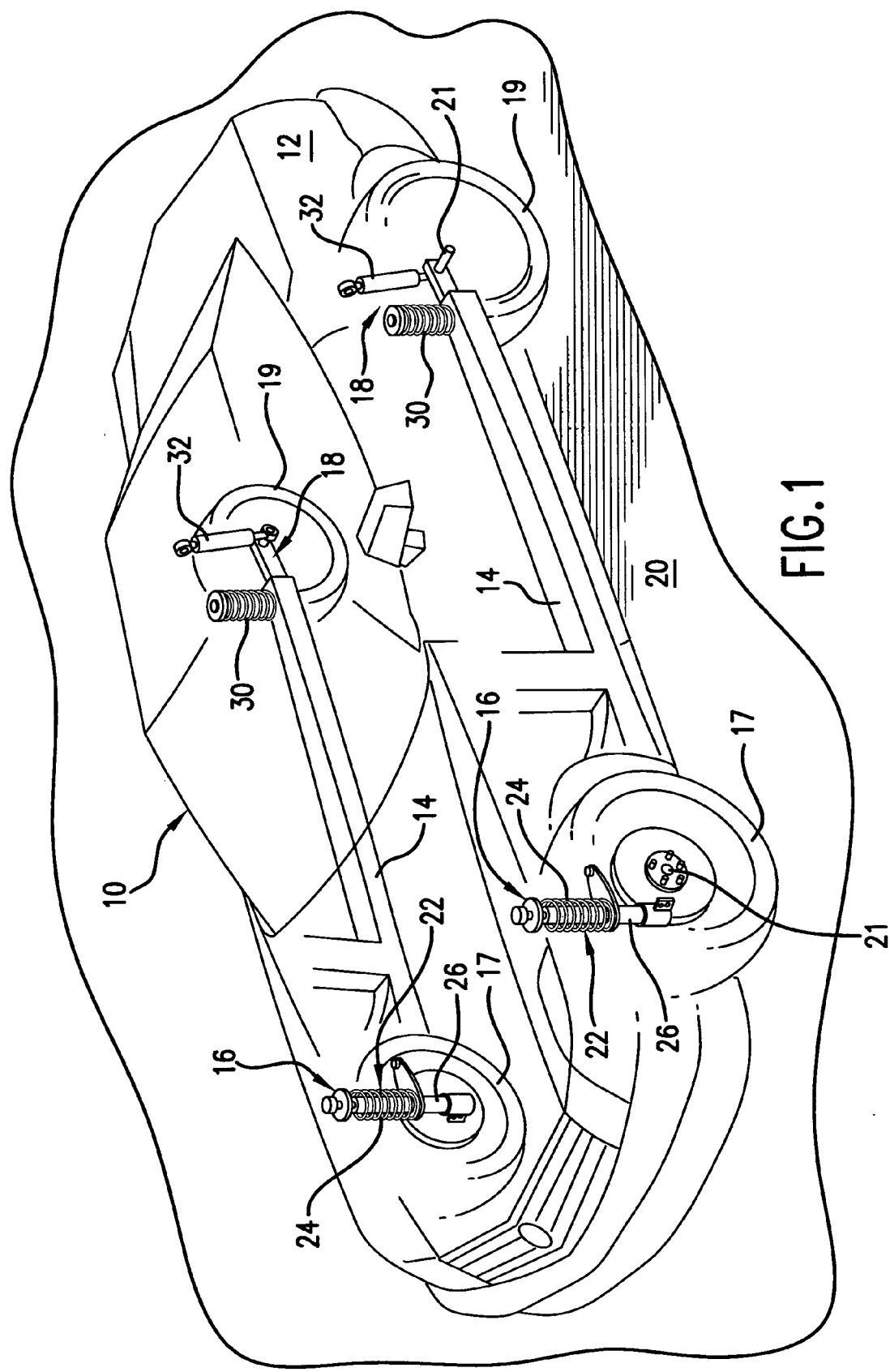
FIG. 1 is a schematic view in perspective of an automotive vehicle showing locations of suspension springs and associated dampers.

Referring now to FIG. 1 there is shown a schematic illustration of an embodiment of an automotive vehicle 10 having a body 12 that is secured to a frame 14 and is sprung by a pair of front suspension systems 16 to front wheels 17 and a pair of rear suspension systems 18 to rear wheels 19. The wheels 17 and 19 roll on a road surface 20, which for the purposes of this discussion is a relatively smooth road surface, the wheels each being attached to the suspension system 16 and 18 by wheel axles 21. The front suspension systems 16 are each comprised of McPherson struts 22 each including a coil spring 24 and a front damper 26, the front damper being configured in accordance with the principles of the present invention. As shown in FIG. 1, the spring and damper form a parallel configuration, characterized by vehicular body forces resulting from the sum of the spring and damper forces. The rear suspension systems 18 are each comprised of a rear coil spring 30 and separate rear damper 32, the rear damper being configured in accordance with the principles of the present invention. The body 12 and frame 14 comprise a unibody which is the sprung weight of the vehicle 10 while the pairs of wheels 17 and 19 comprise the unsprung weight of the vehicle. The coil springs 24 and 30 compress to permit relative movement of unsprung to sprung mass. The dampers 26 and 32 only generate large resistive forces during extension for some types of vehicles, and for other types of vehicles during compression as well. The springs 24 and dampers 30 cooperate to control vertical motions of the vehicle 10, vertical motions of the axles 21, and to provide a pleasant ride for the occupants. While FIG. 1 illustrates an automobile, FIG. 1 is merely exemplary of automotive vehicles 10 in general, including discrete frame and body, unibody, passenger cars, trucks as well as other vehicles that might employ a damper absorbing device such as trains or aircraft.

The present invention utilizes dual stage dampers 26 and 32, which respond to "normal" relative motions of the wheels 17 and 19 to body in a first stage, and with a second stage respond with a very low force, under smaller road irregularities that could otherwise compromise ride comfort. This same relatively low level of force generated by the damper is also advantageous in response to internally generated forces within the vehicle. These internal forces are typically periodic in wheel rotation, originating in imbalance of the rotatable components, non-uniformities of the tire, rim, bearings and eccentricities of assembly of the rotatable components. The dual stage dampers 26 and 32 of the present invention enable dynamic performance to closely approximate that provided by ideal dampers, viz 0° phase lag.

Figure 2:
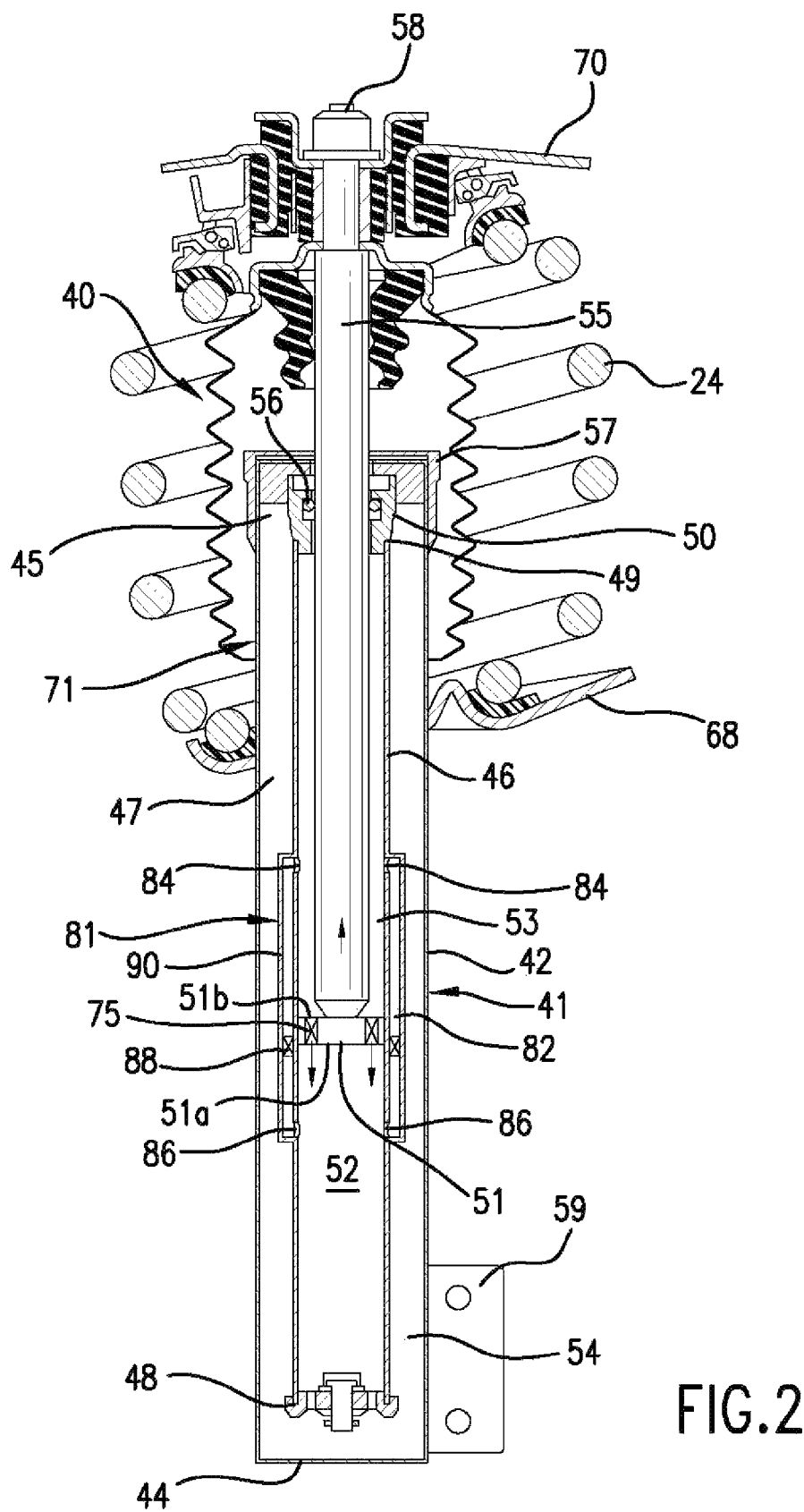
FIG. 2 is an elevation of a strut incorporating a damper configured in accordance with a first embodiment of the damper, wherein the strut supports the sprung mass of an automotive vehicle with respect to a wheel of the vehicle.

FIG. 2 is a McPherson strut assembly 40 that includes a twin-tube type damper assembly 41 with a dual stage assembly, which dual stage assembly alters damping forces for small displacements only in extension in accordance with one aspect of the invention. In accordance with another aspect of the invention, the damper assembly 41 is not limited to improvements just during extension, but uses secondary valves, such as a spool or inertia valve that also provides small displacement damping in compression.

Generally, the twin-tube damper 41 is of a type which generates forces during both compression and extension strokes. A base valve 48 restricts outward flow from chamber 52 to the reservoir 47 during the compression stroke. Optionally, a second valve (not shown) can be incorporated in the piston, restricting the flow from chamber 52 into chamber 53, also during the compression stroke. Otherwise, the flow from chamber 52 to 53 can occur relatively unimpeded with virtually no restriction during the compression stroke. During the extension stroke, a third valve in the piston restricts flow from chamber 53 to chamber 52, wherein damping flow through the piston 51 is controlled by check or differential valving 75 within the piston, which valving throttles fluid flow from second chamber 53 toward first chamber 52 and blocks forced fluid flow through the piston 51 from the first chamber 52 into second chamber 53. Series check valves for both the base and piston valves are incorporated to select the appropriate restriction valves enabling or inhibiting flow depending on the pressure differentials arising in the expansion and compression chambers. Considering the illustrated embodiment of FIG. 2. The damper assembly 41 has an elongated reservoir tube 42 with an integrally formed closed end 44 and a partially plugged open end 45. An elongated cylinder tube 46 is axially disposed within the reservoir tube 42. A reservoir 47 is defined by an annular space between the reservoir tube 42 and the cylinder tube 46. The cylinder tube 46 has a bottom and is defined by a base valve assembly 48 that is in direct connection with the reservoir 47. A top end 49 of the cylinder tube 46 is secured to an annular rod guide assembly 50.

The cylinder tube 46 slidably supports a piston 51 that separates the cylinder tube into a first chamber 52 and a second chamber 53. The piston 51 has a first side 51a facing the first chamber 52 and a second side 51b facing the second chamber 53. The first chamber 52, second chamber 53 and reservoir 47 carry a supply of fluid having liquid and gas components 54 that operates as the damping medium within the damper assembly 41. The piston 51 is connected to a piston rod 55 that extends through the second chamber 53 and exits the damper assembly 41 through the rod guide assembly 50. The piston rod 55 is sealed by a seal 56 and extends from the open end 45 of the reservoir tube 42. The open end 45 is partially closed over the rod guide assembly 50, thereby securing the rod guide assembly in place, and a seal 57 is positioned over the open end 45 to close the reservoir 47.

In a general sense, the first chamber 52 is considered a compression chamber and the second chamber 53 is considered an expansion chamber, however depending on damper hardware, the first and second chambers may not be exclusively compression or expansion chambers. The direction of stroke velocity typically dictates whether the particular chamber 52 or 53 is operating in relative compression, with an increase in dynamic pressure, or in relative expansion, with a decrease in dynamic pressure. Alternating the polarity of the stroke velocity then also alternates the dynamic pressure in a given chamber 52 or 53.

The piston rod 55 includes a threaded end 58 that is secured to the sprung mass of the associated vehicle 10. A mounting bracket 59 is provided near the closed end 44 of the reservoir tube 42 for connection to the associated wheel axle 21 (see FIG. 1) supporting an unsprung mass comprised mainly of one of the front wheels 17 of the associated vehicle 10. As a result of relative movement between the sprung and unsprung masses, the piston 51 moves reciprocally with respect to the cylinder tube 46 as the piston rod 55 enters and exits the damper assembly 41 through the rod guide assembly 50. Sliding movement of the piston 51 within the cylinder tube 46 is inhibited only during extension of the piston rod 55 by the action of fluid resistance on the second side 51b of the piston 51 that is generated by restriction of fluid flow through the valving of the piston. In the twin-tube damper assembly 41, as the piston rod 55 occupies a variable amount of the available volume within the damper assembly, fluid is initially caused to flow through the base valve assembly 48 between first chamber 52 and the reservoir 47. Accordingly, the reservoir 47 must be sufficiently large to accommodate both a varying fluid level and a compressible gas space that is maintained within the reservoir proximate the rod guide assembly 50.

A spring seat 68 is welded to the reservoir tube 42 for supporting one end of one of the coil springs 24 upon which the sprung mass of the vehicle 10 rests. In order to support the sprung weight of the vehicle 10, the other end of the coil spring 24 abuts a wheel house tower portion 70 of the vehicle body 12, which wheel house tower portion is integral with the frame 14 of the vehicle due to unibody construction.

When an associated wheel 17 of FIG. 1 rolls over an imperfection in the surface of the road 20, the housing 71 comprised of reservoir tube 42 and the cylinder tube 46 rises with respect to the wheel house tower 70, thereby compressing the coil spring 24. As the inner tube 46 rises with the housing 71, the piston 51, which is attached to the wheel house tower 70, is approached by the base valve assembly 48 at the bottom of tube 46. This condition causes oil in the first chamber 52 to compress against the first side 51*a* of the piston 51 and to flow through the base valve assembly 48 into the annular reservoir 47 defined between the inner tube 46 and reservoir tube 42. The reservoir tube 42 contains hydraulic liquid as well as nitrogen gas ($N_2$) that is mildly compressed by the inflow liquid from the first chamber 52. As the coil spring 24 decompresses, the body 12 and frame 14 of the automotive vehicle 10 (see FIG. 1) return towards the neutral position. This decompression of coil spring 24 is resisted by forces arising through the action of restricted return flow through the piston 51 as the housing 71 lowers with respect to the piston 51 during decompression of the coil spring. Damping flow through the piston 51 is controlled by check or differential valving 75 within the piston, which valving throttles fluid flow from second chamber 53 toward first chamber 52 and blocks forced fluid flow through the piston 51 from the first chamber 52 into second chamber 53. This provides a smooth ride for the vehicle 10 with respect to impacts from relatively major road imperfections.

In FIG. 2, the piston 51 is shown in a neutral position within the cylinder tube 46, in which the piston 51 reciprocates axially as the vehicle 10 travels over the road surface 20. In accordance with the present invention, the damper assembly 41 includes a second stage 81 for damping out small vibrations induced as the vehicle 10 travels over the road surface 20, which by current standards is considered smooth.

Figure 3:
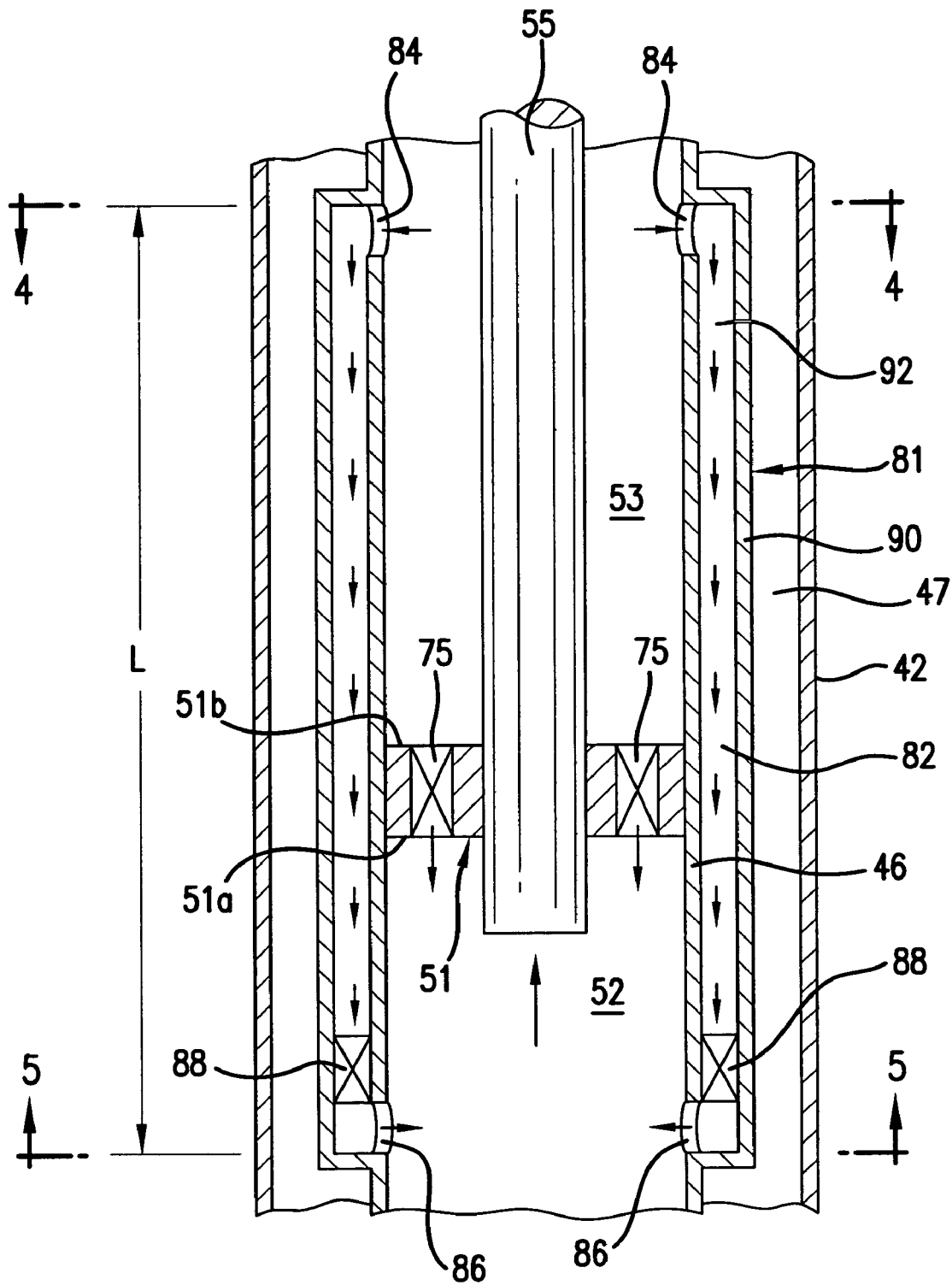
FIG. 3 is an enlarged schematic view of a portion of the damper of FIG. 2.

As is best seen in FIG. 3, the second stage 81 is provided by a fluid bypass passageway 82 bypassing the piston 51. The fluid bypass passageway 82 has at least one first opening 84 and at least one second opening 86. For purposes of clarity, the fluid openings are schematic and are illustrated as relatively wide, whereas the actual openings defining the inlet and outlet are relatively small, for example less than about 3 mm. In the twin tube damper assembly 41, reduced damping only occurs during extension. Likewise, the second damping stage 81 only damps during extension and not during compression. This is because fluid flow through the base valve 48 offers little resistance compared to flow through the bypass passageway 82 of the secondary damping stage 81.

If necessary, secondary check or differential valving 88 is disposed in the bypass passageway 82 to positively limit flow from the second chamber 53 to the first chamber 52. The valving 88 may comprise a check valve or an inertial-type mass valve which closes when the mass is accelerated by fluid pressure. In another approach a sliding annular spool valve is disposed in the passageway 82. The annular spool valve has at least one valve opening that aligns with the at least one second opening 86 when pushed into alignment therewith by a fluid pressure in the passageway 82. If there are additional second openings 86, the sliding annular spool valve has corresponding additional valve openings.

Figure 4:
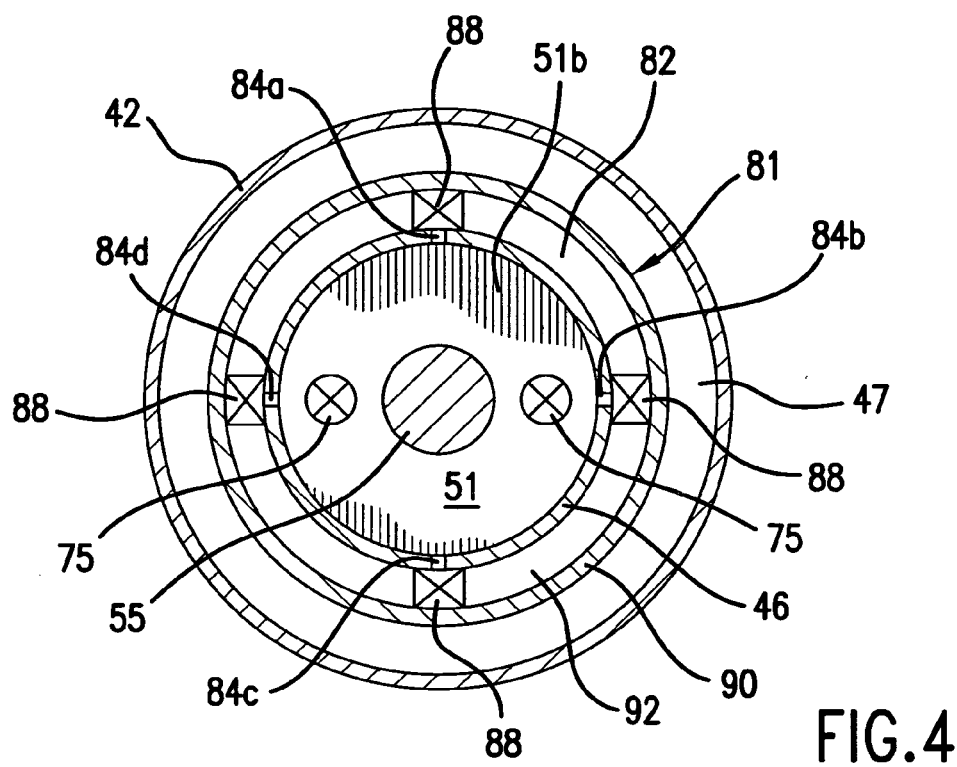
FIG. 4 is an elevation taken along lines 4-4 of FIG. 3.
Figure 5:
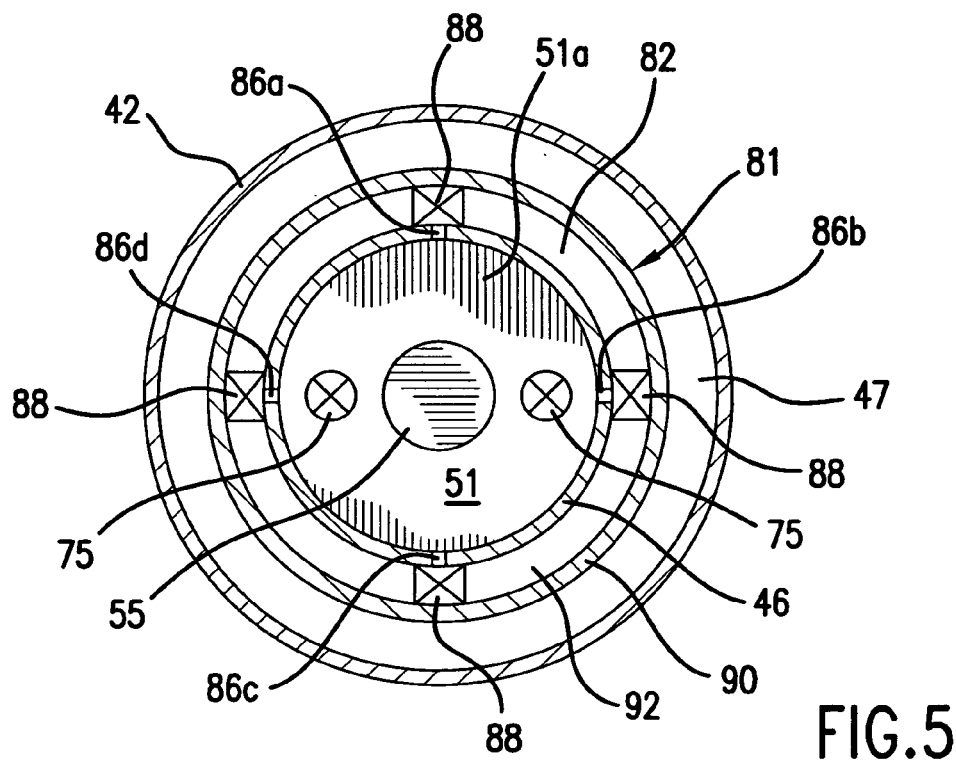
FIG. 5 is an elevation taken along lines 5-5 of FIG. 3.

As is best seen in the elevations of FIGS. 4 and 5 taken through FIG. 3, a preferred configuration of the bypass passageway 82 is as a sleeve 90 disposed around the cylinder tube 46 to define an annular space 92 forming the bypass passageway 82. In the illustrated embodiment there are four circumferentially spaced, metered inlet orifices 84*a*-84*d* providing the first opening 84 to the expansion chamber 53, as well as, for example four circumferentially spaced, metered outlet orifices 86*a*-86*d* providing the second opening 86 to the first chamber 52. While two sets of four metered orifices 84*a*-84*d* and 86*a*-86*d* are illustrated, having at least one first orifice and at least one second orifice, or having any effective number of first and second orifices, is within the scope of this invention.

When the bypass passageway 82 is configured as a sleeve 90, the check or differential valves 88*a*-88*d* are preferably positioned at the orifices of the outlet 86, although such valves may also be positioned at the orifices of the inlet 84. Preferably, if there are four outlet orifices, there is check or differential valving 88 disposed at each orifice of the outlet 86.

The orifices of the inlets and outlets 84 and 86 each have a selected diameter. For example, when arranged in two arrays with four first opening and four second openings 88*a*-88*d* per array, spaced at some angle with respect to one another, a preferred diameter for each of the orifices is 2.1 mm; however other diameters suitable for damping may be selected. These orifices alternatively have pressure related valves to open and close the orifices.

The twin-tube damper assembly 41 of the McPherson strut 40 shown in FIG. 2-5 is also usable for the rear dampers 32 of FIG. 1, wherein the dampers 41 are not coaxial with the coil springs 30. When used in combination with front McPherson struts 40 on a vehicle 10, the suspensions 18 incorporating the damper assembly 14 for the rear wheels 19, provide the vehicle with a soft ride in which vehicular responses to minor imperfections in smooth road surfaces 20 are substantially reduced.

Figure 6:
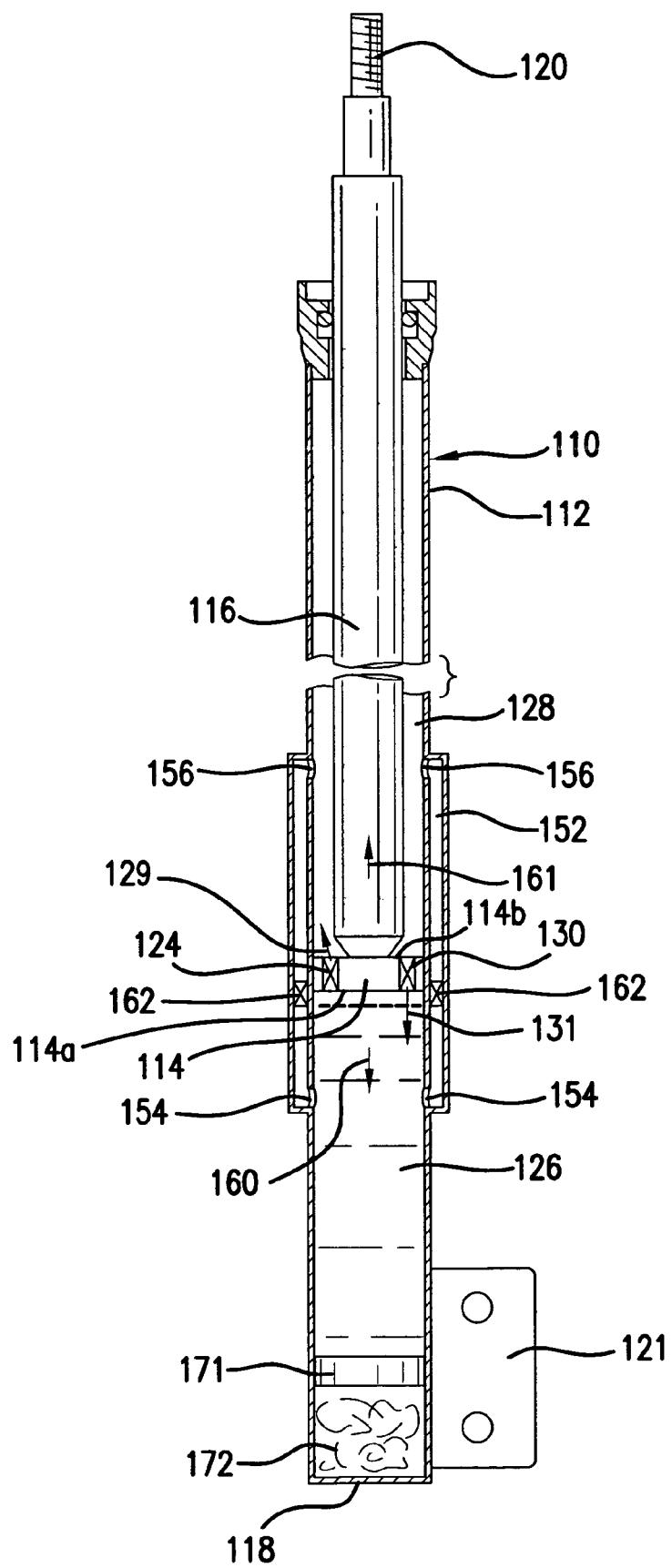
FIG. 6 is an elevation of a second embodiment of a damper configured in accordance with the principles of the present invention.

Referring now to FIG. 6, where a second embodiment of the damper is shown, a mono-tube damper 110 has only a single tube 112 which contains a piston 114 connected to piston rod 116 and a floating piston 171. The piston 114 has a first side 114*a* and a second side 114*b*. The mono-tube damper 110 does not have a reservoir tube such as the reservoir tube 42 of FIGS. 2-5. The mono-tube damper 110 has a first end 118 that is the closed bottom of the single tube 112 and a second end 120 that is the top end portion of the piston rod 116. In the illustrated embodiment, a flange 121 at the first end 118 attaches through a suspension component to a wheel axle 21 (see FIG. 1) and the second end 120 is bolted to a wheel house tower 70 (see FIG. 2) of the vehicle 10. With the mono-tube damper 110, orientation is functionally immaterial so generally, one of the ends 118 or 120, is attached to the associated axle 20 of one of the wheels 17 or 19 of the vehicle 10, while the other end, 120 or 118, is attached to the body 12 and frame 14 of the vehicle. Piston 114 throttles fluid during both compression and extension of the associated suspension spring. The associated suspension spring may be a coaxial coil spring, such as the spring 24 of FIGS. 1 and 2, or a separate spring such as the spring 30 of FIG. 1. The monotube damper 110 contains both liquid in first and second chambers 126 and 128, respectively, and gas in chamber 172, the liquid being hydraulic fluid and the gas typically being nitrogen.

The piston 114 has a first check valve and restriction 124 which resists fluid flowing from the first chamber 126 to the second chamber 128 in the direction of arrow 129 during compression of the damper 110 when fluid pressure is increased against the first side 114a of the piston 114. A second check valve and restriction 130 resists fluid flowing from the second chamber 128 to the first chamber 126 in the direction of arrow 131 during extension when fluid pressure is increased against the second side 114b of the piston 114.

Figure 7:
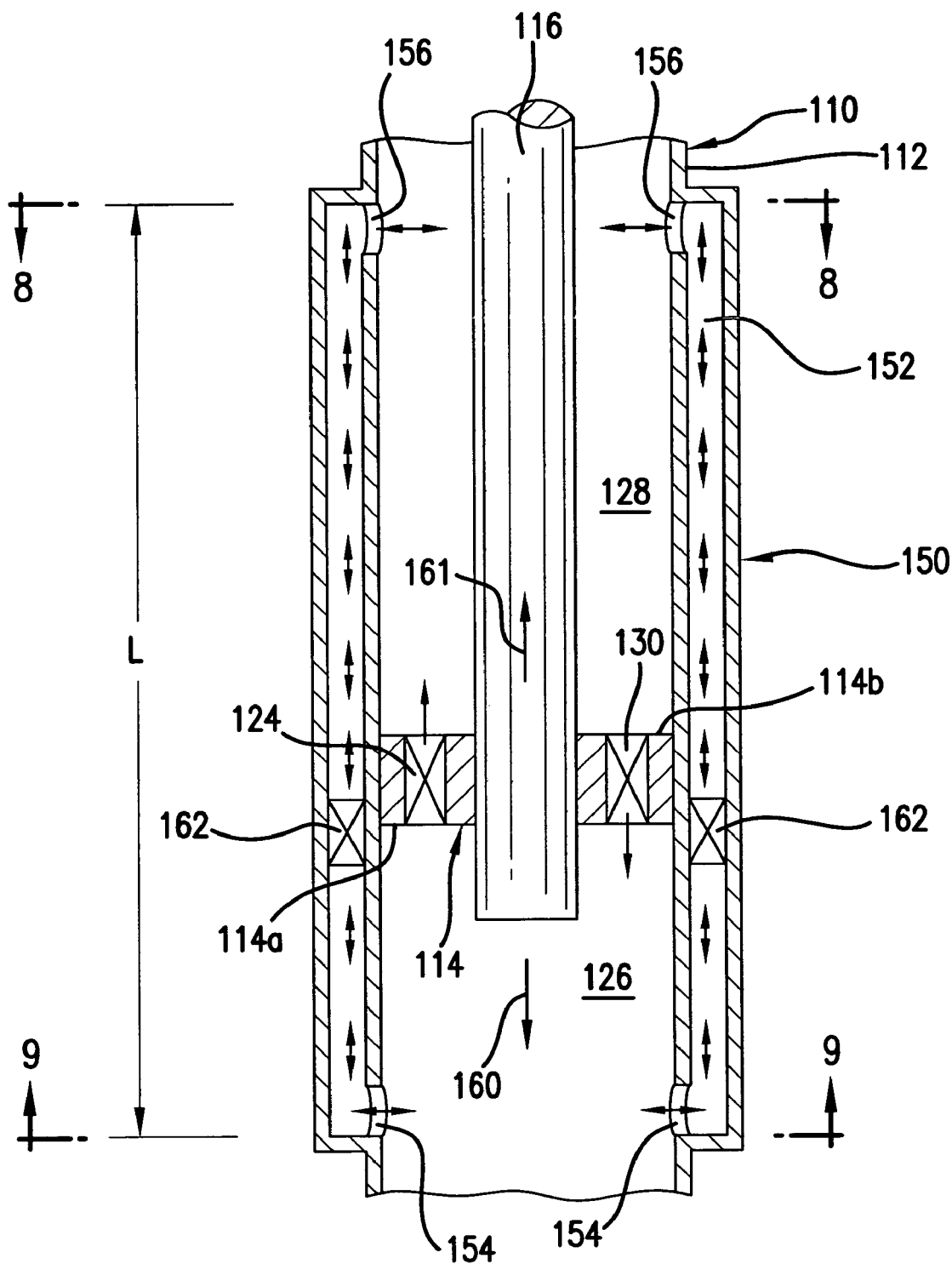
FIG. 7 is an enlarged schematic view of a portion of the damper of FIG. 6.

Referring now to FIG. 7 in combination with FIG. 6, in accordance with the present invention, the mono-tube damper 110 has a second stage damper 150 with a bypass passageway 152 having at least one first opening 154 through the tube 112 into first chamber 126 and at least one second opening 156 through the tube into chamber 128. The openings 154 and 156 straddle the piston 114, which is held in a neutral position by a spring such as the coil spring 24 when the mono-tube damper 110 is used in coaxial arrangements 16 such those provided by the McPherson strut 41 of FIG. 2. For laterally spaced arrangements, a separate spring 30, such as that used in the rear suspension arrangement 18 of FIG. 1, is used to maintain a neutral position for the piston 114.

The second stage damper 150 generates forces under small vibrations induced as the vehicle 10 travels over road surfaces 20, which by current standards are considered relatively smooth. During small compression changes, when the piston 114 moves in direction 160 relative to the tube 112, fluid pressure is dynamically increased in the first chamber 126 and fluid is displaced through the at least one first opening 154 into the bypass passageway 152, displacing the fluid therein through the second opening 156 and into the second chamber 128. During extension of the associated spring 24 or 30 (FIG. 1), when the piston rod 116 moves in the direction of arrow 161 relative to the tube 112, fluid pressure is dynamically increased in the second chamber 128 and fluid is displaced through the at least one second opening 156 into the bypass passageway 152 and displaced from the bypass passageway 152 through the at least one first opening 154 into the first chamber 126.

The first and second openings 154 and 156 are configured as metered orifices having openings, which are for example less than about 3 mm or in a specific example 2.2 mm. Optionally, at least one secondary check or differential valve 162 is employed in the passageway to limit damping of small compressive inputs. The check or differential valve 162 may be configured to contain a weight which is displaced with flow of the fluid to engage a valve seat and block flow of fluid through the valve in one direction only. Alternatively, the secondary valve 162 may be configured as an annular spool valve floating in the bypass passageway 152. As with the previously discussed valve 88, the spool valve 162 has at least one valve opening that aligns with the at least one second opening 156 when pushed into alignment by fluid pressure in the passageway 152.

In both embodiments of the invention, the distance L between the opening 84 and 86 in FIG. 3 and 154 and 156 in FIG. 7 is sufficiently long so that the action provided by the second stages 81 and 150 accommodates compression of the springs 24 and 30 due to heavier loads, such as having five or six passengers instead of just one, or transporting heavier loads, such as increased baggage, construction materials or appliances. Heavier loads simply lower the neutral point of the pistons 51 or 114. Accordingly, the damping of the second stages 81 and 150 is independent of pressure or position and is rather depended on valve configuration. If necessary or desired, the distance L may be short enough so that the pistons 51 or 114 move beyond the openings 84 and 86 of FIG. 2 and 154 and 156 of FIG. 7. Consequently, with a shorter second damping distance L, the damping of second stages 81 and 150 does not function when compression and extension of the springs 24 and 30 is such that the associated piston 51 or 114 moves beyond the openings 84, 86 and 154, 156, resulting in damping which is pressure or position dependent.

Figure 8:
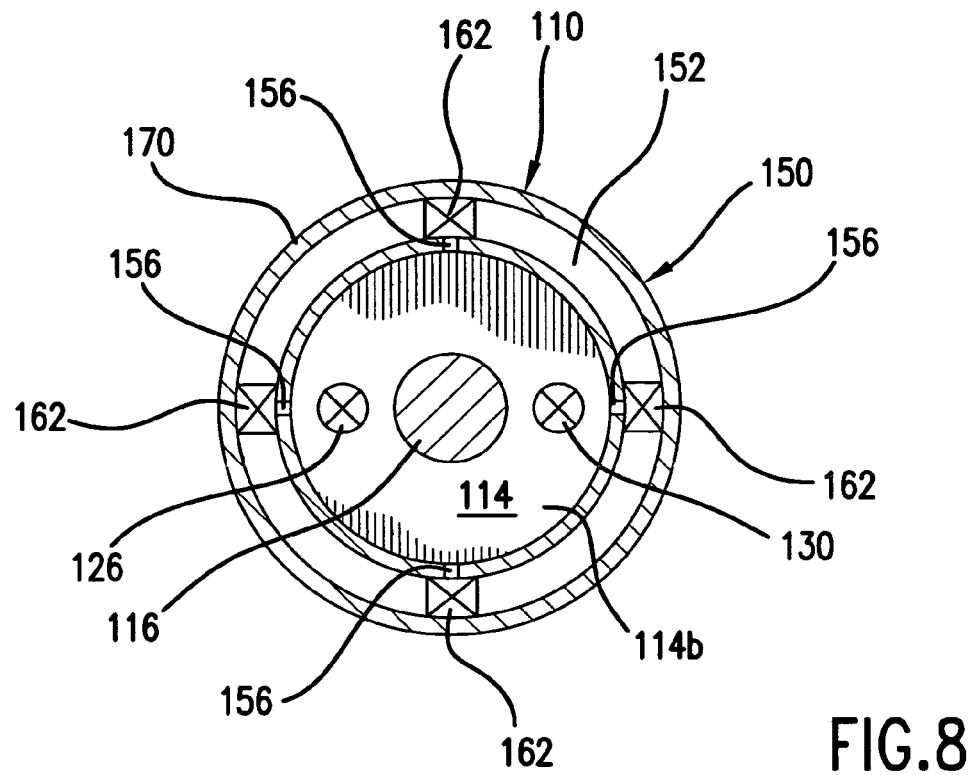
FIG. 8 is an elevation taken along lines 8-8 of FIG. 7.
Figure 9:
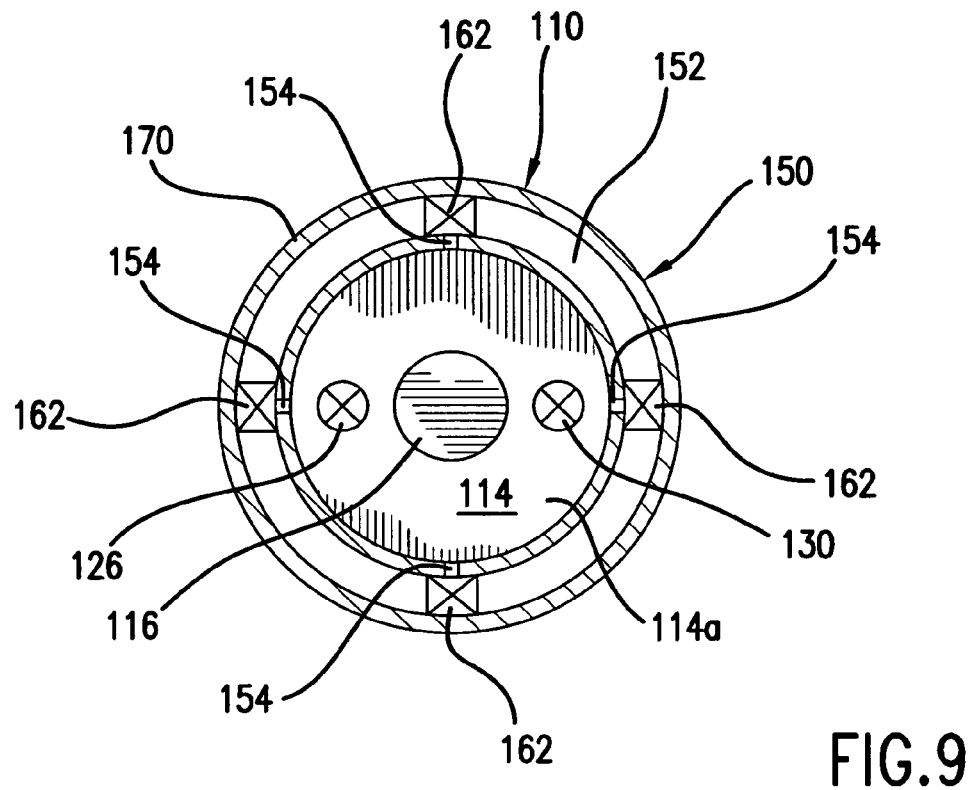
FIG. 9 is an elevation taken along lines 9-9 of FIG. 7.

Referring now to FIGS. 8 and 9, as with the second stage damper 81 of FIG. 2, the second stage damper 150 in a preferred embodiment is configured as a sleeve 170 defining the passage 152. As is seen in FIGS. 8 and 9, the sleeve 170 has therein four first orifices 154a-154d spaced 90° from one another and opening to the first chamber 126 and four second orifices 156a-156d spaced 90° from one another and opening to the second chamber 128. An example of a diameter for each port 154 and 156 is 2.1 mm; however, other diameters are within the scope of the invention, 2.1 mm being exemplary.

Figure 10:
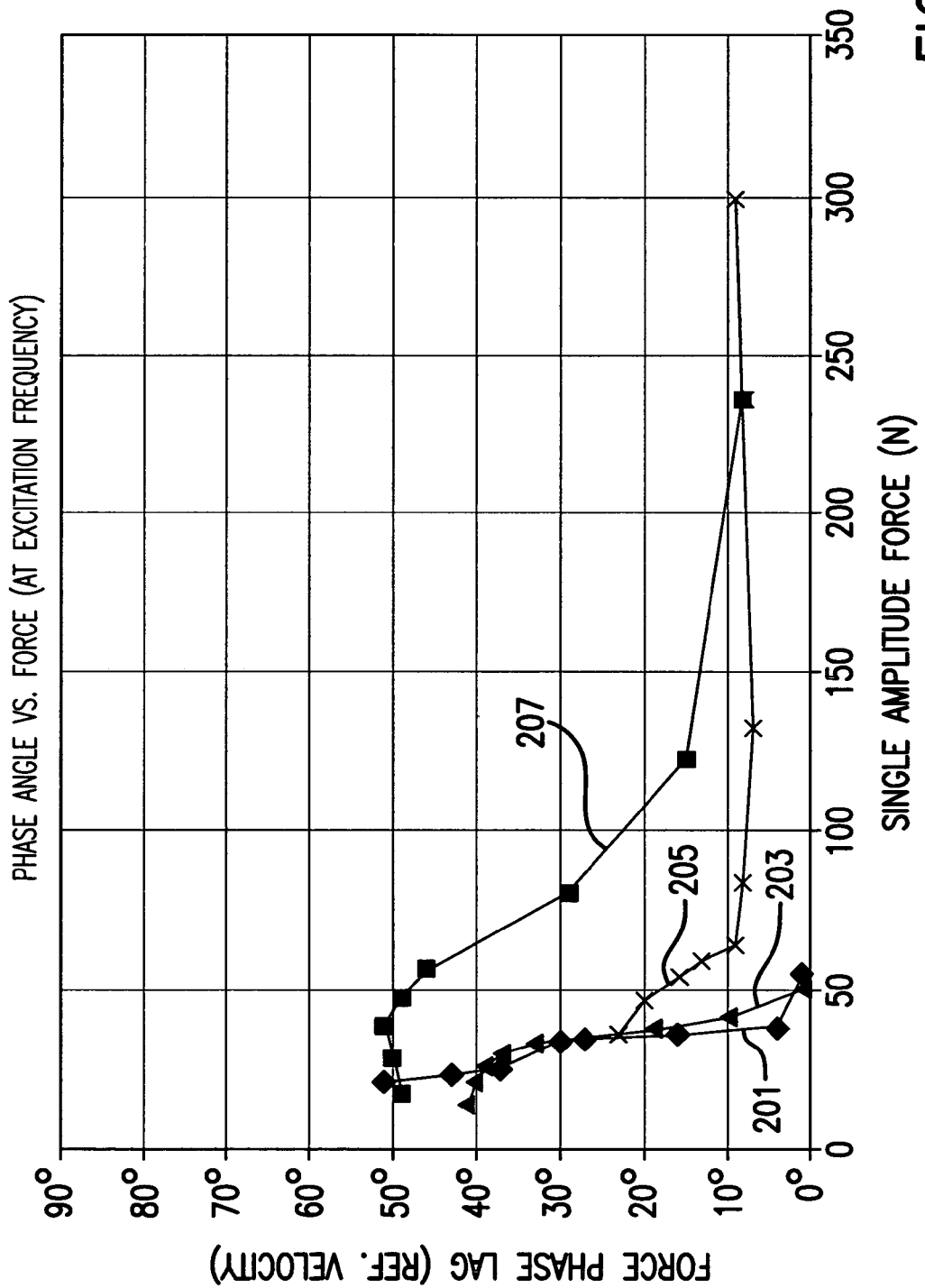
FIG. 10 is a graph plotting relative damper phase lag of force to velocity for a sinusoidally varying velocity at fixed frequency as measured on conventional laboratory apparatus.
Figure 11:
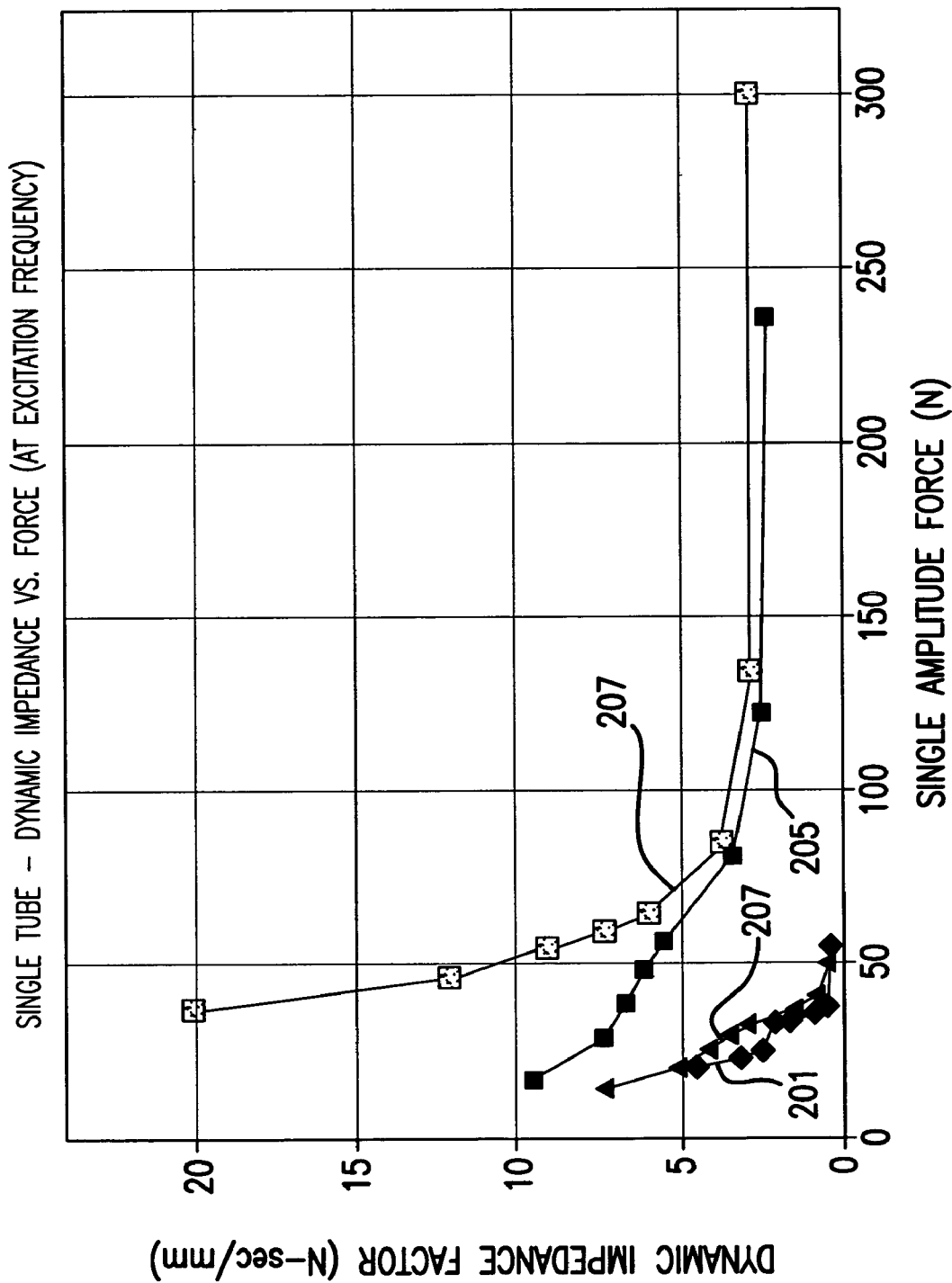
FIG. 11 is a graph plotting the gain factor of the dynamic impedance as a function of the sinusoidally varying force as measured on the laboratory apparatus.

FIGS. 10 and 11 establish that real damper forces, at very low force inputs from low level impacts of smooth roads, correspond closely to ideal damper forces. In FIG. 10 the dynamic force is plotted as a function of the driving force (at the driven frequency) and in FIG. 11, the amplitude of the dynamic impedance is plotted as a function of the driving force (at the driven frequency). In each graph, as single amplitude driven forces (measured in Newtons) increase, the relative phase (measured in degrees), as well as the amplitude of the dynamic impedance (measured in Newtons-sec/mm) decrease.

Target line 201 is a plot of ideal target response points, empirically selected for a smooth ride for the vehicle 10, on what is considered the smooth road surface 20 of FIG. 1. Line 203 is a plot of response points of a dual stage damper, such as the damper assembly 41 of FIG. 2 having second stage damping 81 responding to the smooth road surface 20. For small excitations of less than 50 Newtons, the second stage damping 81 results in a plot of points for the line 203 of the damper assembly 41 which closely approximates the ideal target line 201 for the target response points.

The lines 205 and 207 plot responses of other dampers, not having second stage damping 81, to smooth road inputs exemplified by the single amplitude forces plotted along the abscissas of FIGS. 10 and 11. As is seen in FIG. 10, lines 205 and 207 both have substantially higher dynamic impedance amplitudes at single amplitude excitations less than 50 Newtons. The damper of line 205 has a phase which diverges from the target line 201 as the driven force approaches the 50 Newton level, while the damper of line 207 remains substantially displaced from the ideal target line 201 as excitations approach the 50 Newton level.

As is seen in FIG. 11, the response of the dampers represented by lines 205 and 207 remain substantially displaced from the ideal target line 203 as excitation forces represented by the single amplitude forces increase toward the 50 Newton level, with the amplitude of the dynamic impedance remaining substantially higher when approaching and extending slightly past the 50 Newton level.

While the aforedescribed twin-tube and mono-tube dampers 41 and 110, respectively, are two stage dampers configured for use with existing damper structures, the dampers may be used with other damper structures now existing or subsequently developed.

While preferred embodiments of the dampers utilizes sleeves to define bypass passages providing second stage damping, other embodiments within the scope of the invention may include, but are not limited to, restrictive tubes or other tubes extending between the expansion and compression chambers for metering fluid as the pistons 51 and 114 reciprocate. The tubes are made of any material, for example metal or plastic.

A method for testing dampers that damp small vehicular body and suspension motions arising during operation on relatively smooth road surfaces is described in a co-pending, co-assigned U.S. patent application titled, "Methods For Evaluating Damping Characteristics Of Vehicular Dampers At Low Excitation Velocities", incorporated herein in its entirety by reference.

From the foregoing description, one skilled in the art can easily ascertain the essential characteristics of this invention, and without departing form the spirit and scope thereof, can make various changes and modifications of the invention to adapt it to various usages and conditions.

We claim:

1. A damper for damping responses by a spring and damper forming a parallel configuration supporting a sprung vehicle body member on a wheel axle member; the damper comprising:
   a housing arrangement connected to one of the sprung vehicle body member and the wheel axle member;
   a piston connected to the other of the sprung vehicle body member and the wheel axle member, the piston dividing the housing arrangement into first and second fluid chambers;
   a main fluid passage piston valving extending through said piston; and
   a bypass passageway for transferring fluid between the first and second fluid chambers to provide quasi-ideal damping at low force excitation, wherein when the piston is in a neutral position the bypass passageway has at least one first opening on a first side of the piston communicating with one of said first and second fluid chambers and at least one second opening on a second side of the piston communicating with the other of said first and second fluid chambers, wherein the at least one first opening and the at least one second opening are displaced by a distance selected to accommodate piston travel occasioned by minimal movements of the wheel axle member, and wherein said bypass passageway has a total length which is less than substantially one-half that of said housing arrangement;
   wherein the housing arrangement comprises at least one axially extending tube connected to said one of the sprung vehicle body member and the wheel axle member with the piston mounted to axially reciprocate within the at least one axially extending tube to move a piston rod connected to said other of the sprung vehicle body member and the wheel axle member in response to movements of the wheel axle member;
   wherein the damper includes a reservoir in fluid communication with one of the chambers of the at least one axially extending tube through a passage;
   wherein said bypass passageway is structured such that the transferring of fluid through the bypass passageway between the first and second fluid chambers occurs free of intermixing of fluid of the bypass passageway with fluid of said reservoir;
   wherein the reservoir is tubular and is coaxial with the at least one axially extending tube; and
   wherein the bypass passageway is configured as a sleeve disposed around the at least one axially extending tube, wherein said sleeve is coterminous with said bypass passageway such that said sleeve extends a total length which is less than substantially one-half that of said housing arrangement.

2. The damper of claim 1 wherein the at least one first opening comprises a plurality of first openings, and the at least one second opening comprises a plurality of second openings.

3. The damper of claim 2 wherein the plurality of first openings are circumferentially spaced from one another, and wherein the plurality of second openings are circumferentially spaced from one another.

4. The damper of claim 2 wherein the plurality of first openings comprises four first openings equally spaced from one another; wherein the plurality of second openings comprises four second openings equally spaced from one another, and wherein the four first openings and the four second openings have check or differential valves in communication therewith for controlling the rate of fluid displacement through the bypass passageway.

5. A damper for damping responses by a spring arrangement supporting a sprung vehicle body member on a wheel axle member of a vehicle; the damper comprising:
   at least one cylindrical tube connected to one of the members, said at least one cylindrical tube having a tube length;
   a piston connected by a piston rod to the other member, the piston having a first side and a second side dividing the at least one cylindrical tube into first and second chambers;
   a fluid within the chambers, the fluid having a liquid component and a gas component;
   a main fluid passage piston valving extending through said piston;
   a fluid bypass passage comprising a sleeve surrounding the at least one cylindrical tube for transferring fluid between the first and second chambers to provide quasi-ideal damping at low excitation force to the wheel axle member of the vehicle, said fluid bypass passage extending in total a total passage length, wherein said total passage length is less than substantially one-half said tube length, said fluid bypass passage having at least one first metered orifice opening to the first chamber on the first side of the piston and at least one second metered orifice opening to the second chamber on the second side of the piston when the piston is at a neutral position, the at least one first metered orifice opening and the at least one second metered orifice opening being mutually separated by a distance less than substantially one-half said tube length and selected to accommodate piston travel occasioned by low force excitations to the wheel axle member; and
   a reservoir in fluid communication with the at least one cylindrical tube, wherein the reservoir is tubular and coaxially disposed with respect to the at least one cylindrical tube and the sleeve;
   wherein said fluid bypass passage is structured such that the transferring of fluid through the fluid bypass passage between the first and second fluid chambers occurs free of intermixing of fluid of the fluid bypass passage with fluid of said reservoir; and
   wherein said sleeve is coterminous with said fluid bypass passage such that said sleeve extends a total length which is less than substantially one-half that of said tube length.

6. The damper of claim 5 wherein said at least one cylindrical tube comprises a single axially extending tube and wherein the fluid bypass passage and the main fluid passage piston valving are constructed and arranged to restrict fluid flow during both compression of the spring arrangement and extension of the piston rod.

7. The damper of claim 6 wherein said at least one first metered orifice opening comprises a plurality of first openings; and wherein said at least one second metered orifice opening comprises a plurality of second openings.

8. The damper of claim 7 wherein the plurality of first openings are spaced circumferentially from one another; and wherein the plurality of second openings are spaced circumferentially from one another.

9. The damper of claim 8 wherein the plurality of first openings comprises four first openings equally spaced from one another; wherein the plurality of second openings comprises four second openings equally spaced from one another, and wherein the four first openings and the four second openings have check or differential valves in communication therewith for controlling the rate of fluid displacement through the fluid bypass passage.

10. The damper of claim 5 wherein the at least one first metered orifices comprise a plurality of first metered orifices which are angularly spaced from one another, and wherein the at least one second metered orifices comprise a plurality of second metered orifices which are angularly spaced from one another.

11. The damper of claim 10 wherein the fluid bypass passage is constructed and arranged to damp fluid flow during extension of the piston rod and block fluid flow during compression of the spring arrangement.

12. The damper of claim 5 wherein said at least one cylindrical tube comprises a single cylindrical tube and the fluid bypass passage is constructed and arranged to restrict fluid flow during both compression of the spring arrangement and extension of the piston rod.

13. The damper of claim 5 wherein the fluid bypass passage is constructed and arranged to restrict fluid flow during extension of the piston rod and block fluid flow during compression of the spring arrangement.

* * * * *